US009246615B2

(12) United States Patent
Ellegard et al.

(10) Patent No.: US 9,246,615 B2
(45) Date of Patent: Jan. 26, 2016

(54) DELAY MEASUREMENT IN A POINT TO MULTIPOINT SYSTEM

(71) Applicant: Microsemi Communications, Inc., Aliso Viejo, CA (US)

(72) Inventors: Lars Ellegard, Frederiksberg C (DK); Thomas Kirkegaard Joergensen, Soeborg (DK)

(73) Assignee: Microsemi Communications, Inc., Aliso Viejo, CA (US)

( * ) Notice: Subject to any disclaimer, the term of this patent is extended or adjusted under 35 U.S.C. 154(b) by 214 days.

(21) Appl. No.: 14/040,320

(22) Filed: Sep. 27, 2013

(65) Prior Publication Data

US 2014/0092923 A1 Apr. 3, 2014

Related U.S. Application Data

(60) Provisional application No. 61/707,753, filed on Sep. 28, 2012.

(51) Int. Cl.
*H04J 3/06* (2006.01)
(52) U.S. Cl.
CPC ............ *H04J 3/0682* (2013.01); *H04J 3/0667* (2013.01)

(58) Field of Classification Search
USPC .................................. 370/503, 501, 324, 350
See application file for complete search history.

(56) References Cited

U.S. PATENT DOCUMENTS

| 6,647,246 | B1* | 11/2003 | Lu ............................. 455/67.11 |
| 8,806,063 | B1* | 8/2014 | Kamath et al. ................ 709/248 |
| 2010/0098433 | A1* | 4/2010 | Boyd et al. .................... 398/155 |
| 2011/0026394 | A1* | 2/2011 | Feng et al. .................... 370/217 |

* cited by examiner

*Primary Examiner* — Dang Ton
*Assistant Examiner* — Pamit Kaur
(74) *Attorney, Agent, or Firm* — Simon Kahn

(57) ABSTRACT

A system and method for measuring a propagation delay in a point to multipoint network. The system includes a central timing module which provides a timing signal to a plurality of line cards. Each of the line cards includes a local clock that is frequency locked to a 1588 clock and is configured to generate a return timing signal to the central timing module after a predetermined number of clock cycles. The central timing module measures the propagation delay based on the clock cycles of the local clock counted before the return signal is generated and the period of the local clock.

20 Claims, 8 Drawing Sheets

DELAY MEASUREMENT IN A POINT TO MULTIPOINT SYSTEM

CROSS-REFERENCE TO RELATED APPLICATION

This application claims the benefit of the filing date of U.S. Provisional Patent Application No. 61/707,753 filed on Sep. 28, 2012, the disclosure of which is incorporated by reference herein.

BACKGROUND OF THE INVENTION

The present invention relates generally to synchronization of clocks and, more particularly, to synchronization of clocks within a network node or element, for example within a chassis including multiple line cards.

It may be advantageous for devices in a networked system to have a common time base. The common time base may be used, for example, to trigger coordinated measurement instances in a network of sensors or to coordinate actions of controllers in an industrial system. In addition to sensors and controllers, the system may include computers and communication devices, such as routers. The electronics industry has developed several standard protocols for use in synchronizing clocks, for example, the Precision Time Protocol (PTP) of IEEE 1588. PTP includes sending timing-related messages between nodes in a communication network.

Errors and inaccuracies may result from unaccounted for delays in distributing a local clock signal within a node, however. That is, a local clock or a pulse synchronizing local clocks distributed from a central module to modules within the node may encounter different delays in transmission to different modules within the node, which may result in different modules of a node having a module dependent timestamp offset that is difficult to compensate for. Accounting for module dependent variations may be difficult, particularly if delays may vary over time or if modules include varying numbers of internal buffers buffering the local clock or synchronizing pulse.

BRIEF SUMMARY OF THE INVENTION

Aspects of the invention provide for measuring propagation delay in a communication network. In some aspects, the invention provides for a method for measuring propagation delay in a multi-point communication system, comprising: generating a timing signal from a central timing module; transmitting the timing signal to at least one line card, the line card including a local time counter (LTC), the local time counter being configured to count a number of clock cycles of a local clock; receiving a timing response from the line card including timing delay information for the line card, the timing response being generated via the line card when the LTC reaches a predetermined count after reception of the timing signal; and measuring the propagation delay based on the timing delay information for the line card.

In some aspects, the invention provides a method for measuring propagation delay in a multi-point communication system, comprising: generating a timing signal from a central timing module; distributing the timing signal to a plurality of receiving devices, each of the receiving devices being configured with a local time counter, the local time counter configured to count clock cycles of a local clock; receiving a reply message from each of the receiving devices, each reply message including timing delay information for a receiving device, the reply messages being generated by each of the receiving devices according to a slot time for the receiving device; measuring the propagation delay between the central timing module and each of the receiving devices based on the reply message from each of the receiving devices.

In some aspects, the invention provides a system for measuring propagation delay in a communication network, the system comprising: a timing module configured to distribute a timing signal; and at least one line card to receive a timing signal from the first module, the at least one line card including a local time counter (LTC), wherein the LTC counts clock cycles of a local clock and the at least one line card is configured to generate a return timing signal after a predetermined number of clock cycles of a local clock signal, wherein the timing module calculates the propagation delay relative to the at least one line card based on at least the LTC count and the local clock period.

In some aspects, the invention provides a method for conducting timing related processing in a multi-point communication system, comprising: generating a timing signal from a central timing module; transmitting the timing signal to at least one line card, the line card including a local time counter (LTC) and a local clock, the local time counter being configured to count a number of clock cycles of a local clock; receiving a timing response from the line card including timing delay information for the line card, the timing response being generated via the line card when the LTC reaches a predetermined count; measuring the propagation delay based on the timing delay information for the line card; and providing the propagation delay to the at least one line card for synchronization of the at least one line card with the central timing module.

These and other aspects of the invention are more fully comprehended on review of this disclosure.

DETAILED DESCRIPTION

Figure 1A:
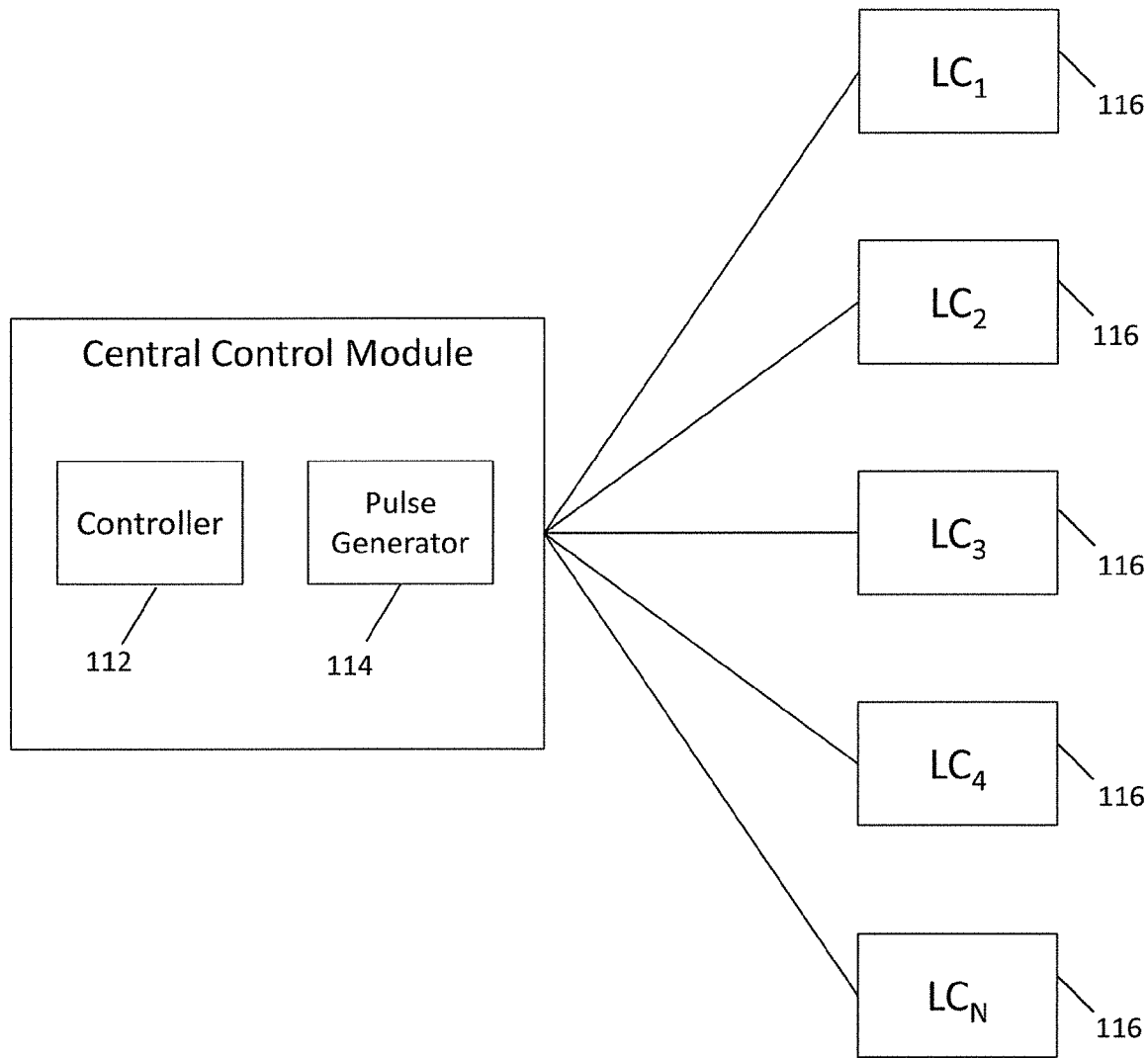
FIG. 1A is a block diagram of a system in accordance with aspects of the invention.

FIG. 1A is a block diagram illustrating portions of a network node in accordance with aspects of the present invention. Referring to FIG. 1, the node includes a central control module 110 and a plurality of line cards 116 including various circuitry therein. The central control module may be configured to transmit and receive signals, for example in the form of pulses or packets, to and from each of a plurality of line cards 116, with the line cards also so configured. In various embodiments the central control module and the line cards may be in a common chassis, for example. In some embodiments the line cards may include or instead be modules within a chip, and the modules may all be in a single chip or distributed across various chips on a common circuit board. For purposes of FIG. 1A the discussion shall primarily reference line cards, but it should be understood that in various embodiments the line cards of FIG. 1A are replaced with chips or modules within chips.

The central control module may include a controller 112 and a pulse generator 114. The controller may be configured with a processor, memory and other circuitry to control the pulse generator to generate a pulse signal and to distribute the pulse signal to the line cards. In addition, the controller may also be used to measure a propagation delay between the central control module and the line cards, for example based on time of receipt of a responsive signal from each of the line cards. In some embodiments the pulse signal may comprise, for example, a 1 pulse per second (PPS) signal, or a load/save signal. In some embodiments the central control module may be a central timing module, for example a control 1588 module, and may additionally distribute a local 1588 clock. In various embodiments the local 1588 clock distributed to each line card is modified based on the propagation delay for each of the line cards. In some embodiments each of the line cards is provided a common local 1588 clock and information indicative of the propagation delay, with the line cards locally modifying the local 1588 clock based on the propagation delay.

Each of the line cards may be configured with an application specific integrated circuit (ASIC) or a plurality of ASICs. For example, a line card may include an Ethernet ASIC, a Serial AT Attachment (SATA) link, a Gigabit Passive Optical Network (GPON) ASIC or any other ASIC. Each of the line cards may be configured to receive the pulse signal from the central module. In some embodiments, the line cards may further distribute the clock signal to each of the ASICs included therein.

The line cards may also receive a local clock to provide a time basis for processes executed within each of the line cards. In some embodiments, the local clock may be local 1588 clock, locked to an IEEE 1588 compliant clock to further support time synchronization. The line cards may also include a local time counter configured to count the clock cycles of the local clock. The line cards may generate a return signal in response to the clock signal. In some embodiments, the return signal may be generated according to a slot time for each of the line cards. The return signal may thereafter be used by the central control module to determine a propagation delay measurement.

In operation, the central control module may generate and transmit a pulse signal to each of the line cards. In some embodiments, the central module may determine a time at which the pulse signal is transmitted. The transmit time may be stored and used for calculating a delay time relative to each of the receiving line cards, or submodules, for example a local time counter (LTC), within a line card.

Each of the line cards receives the pulse signal. In response, a submodule, for example an LTC, of the line card begins to count cycles of a local clock signal. When the LTC count reaches a predetermined count value, the line card generates a return signal. In some embodiments, the return signal may be generated on a time slotted basis, with various LTCs counting to various different predetermined count values prior to generating the return signal.

The return signal may include the count value of the LTC and the period of the local clock, for example. The return signal may be provided to the central timing module and used to calculate a propagation delay relative to each of the line cards, or submodules within a line card.

In some embodiments the central control module may adjust timing of a local 1588 clock signal to the line cards based on the calculated propagation delay information. In some embodiments, the central control module may provide the calculated propagation delay information to the line cards to allow for synchronization of each of the line cards with the central module. The propagation delay information may also be provided to each of the ASICs within a line card for synchronization of the ASICS with the central timing module. In some embodiments, the each of the line cards may provide delay information to determine other line cards to enable synchronization between each of the line cards.

Figure 1B:
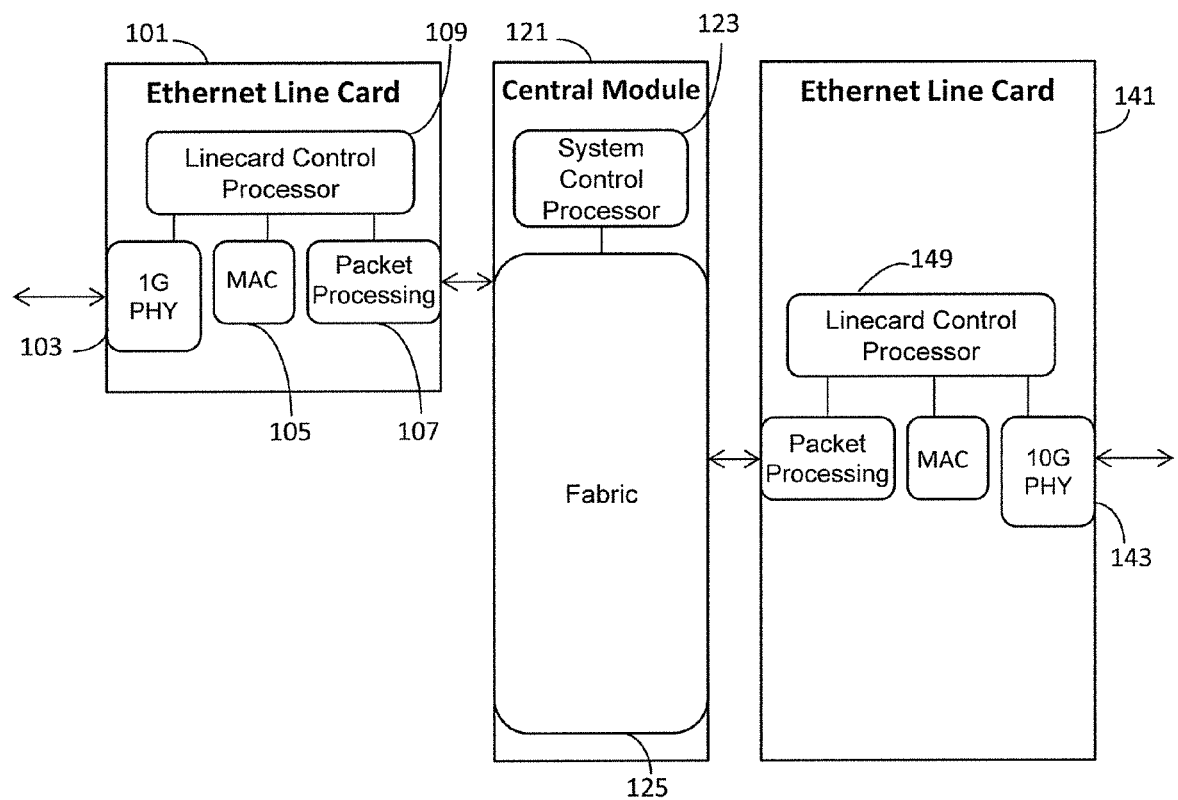
FIG. 1B is a block diagram of a system in accordance with aspects of the invention.

FIG. 1B is a block diagram of an exemplary communication node in accordance with aspects of the invention. The communication node includes a first line card 101 and a second line card 141. Other embodiments may have a greater number of line cards. Each line card may be coupled to a physical medium, such as a fiber optic link, and to a system card 121 of the communication node. The line cards transmit and receive packets over the physical media and supply and receive packets to and from the system card. The line cards may process some of the information before transmitting it on the physical media or supplying it to the system card. In some embodiments separate line cards are not used, but instead components of the line cards are on a single line card, or on a single chip.

The system card includes a switching fabric 125 that routes packets between the line cards. A control processor 123 is included in system card and configures operation of the switching fabric. The control processor may additionally process packets identified by the line cards for additional processing of timing information. In various embodiments the system card also includes a central control module as discussed with respect to FIG. 1A.

The first line card 101 is coupled to the system card 121 by a packet processing block 107 that may modify packets according to requirements of the line card and the system card. A line-card control processor 109 provides programmable operations for the line card such as setting configurations and handling exceptions from other blocks of the line card. A media access control (MAC) block 105 that performs operations for the Ethernet MAC sublayer. The first line card uses a gigabit Ethernet PHY 103 to couple to the physical medium. Packets arriving at the line card are generally received by the PHY, transferred to the MAC block and then to the system card. Packets from the line card are generally transmitted by the PHY after being transferred from the system via the MAC block. In some embodiments, the first line card may couple to multiple physical media links and include a corresponding number of PHYs. Each physical medium link may be associated with a port of the line card. The multiple PHYs may be integrated in one integrated circuit.

The gigabit Ethernet PHY 103 and the 106 PHY include circuitry to provide processing for timing protocols. In particular, the PHYs may include circuitry for extracting timing messages, determining timing related actions, and for performing timing related actions, for example, modifying a time stamp parameter according to a delay in the node.

In modifying time stamp parameters, the circuitry makes use of a local clock. In various embodiments for each line card, or each PHY, or for various modules of the circuitry within the PHYs, the local clock is adjusted to account propagation delays from a source of the local clock to the line card, PHYs, and/or modules. For example, the local clock may be distributed by a module on the system card, and the module may distribute a pulse to the line cards, as discussed with respect to FIG. 1A, the line cards responding to the pulse, for example using a local time counter as discussed with respect to FIG. 1A, and in a time slotted manner in various embodiments. The module on the system card determines a propagation delay based on the time of transmission of the pulse, the time of reception of the responsive pulse, and possibly any delays due to time slotting for the responsive pulse. The module on the system card may provide the line card information as to the propagation delay with the line card locally adjusting the local clock to account for the propagation delay. Alternatively, the module of the system card may provide separate local clocks, and adjust those separate local clocks based on corresponding propagation delay.

Figure 2:
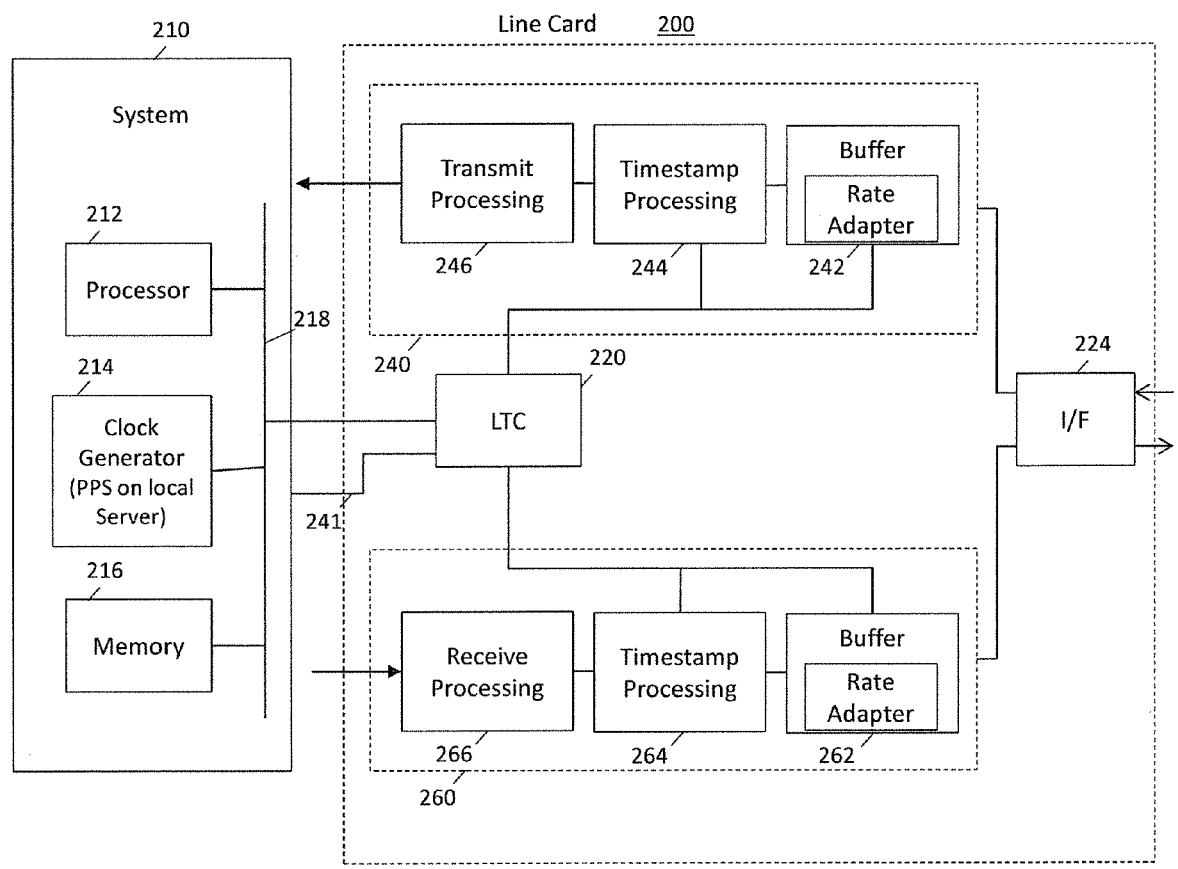
FIG. 2 is an expanded block diagram of line card in accordance with aspects of the invention.

FIG. 2 is a block diagram illustrating a communication system in accordance with aspects of the invention. The system 200 includes a central module 210 and a line card 205. Additional line cards may also be included in communication system 200.

The central module may include a processor 212, a clock generator 214 and a memory. The clock generator generates a timing signal which may be distributed to line card 205. For example, in some embodiments the clock generator may generate a 1 pulse per second (1 PPS) signal.

The central module may also be configured with program code to measure propagation delay between the central module and a line card. The program code may be stored in memory and may be used calculate propagation delay of packets across the communication network.

Line card 205 may include a physical layer communication device (PHY), such as a 10 Gb or 100 Gb device, for example. The PHY includes a receive path block 260 to receive an input signal from a communication network and a transmit path block 240 to transmit an output signal to the communication network. The PHY also includes an interface block 224 for coupling to higher-level devices. In some embodiments, various other processing or formatting blocks may also be included in the signal path between the receive path block 260 and the interface block 224 and the transmit path block 240 and the interface block 224. The blocks of the PHY are generally implemented with electronic circuitry. For example, in one embodiment the PHY is provided in a CMOS integrated circuit. Software programming may be used to control operation of some circuitry in the PHY. In one embodiment, a programmable processor is used to configure the circuitry of the PHY and to handle exception conditions.

The PHY communicates through the interface block 224 with data formatted according to a packet protocol. According to the packet protocol, for example, Ethernet, data may be communicated between the PHY and the interface block asynchronously or at irregular intervals. In contrast, the PHY may be configured to send and receive data to and from the communication network formatted according to a synchronous protocol, which sends data in frames that occur at regular intervals. The PHY maps packets into frames for transmission in the communication network and extracts packets from frames received from the communication network.

The PHY also provides processing of timing-related messages contained in some packets. For packets transmitted to the communication network with a timing-related message, the PHY determines the time that the packet will be transmitted. For packets received from the communication network with a timing-related message, the PHY determines the time that the packet was received. In some packets, the PHY may supply the times of transmission or receipt to a higher-level device for further use.

The interface block 224 provides an interface that may be coupled to a higher-level component, such as a media access controller (MAC). The interface may also be coupled to another PHY. The interface may be a standardized interface, for example, a ten-gigabit media-independent interface (XGMII). The interface block 224 receives packets from the receive path block 260. The interface block 224 transmits the received packets over the interface. The interface is bidirectional and the interface block 224 receives packets for transmission over the interface. Packets received over the interface are supplied to the transmit path block 240. In other embodiments, there are separate interface blocks for receive and transmit.

The transmit path block 240 includes a buffer and rate adapter block 242 that receives data packets from the interface block 224. Some of the data packets include timing-related messages that are modified or determined by the transmit timestamp processing block 244. In some embodiments, the transmit timestamp processing block 244 modifies the contents of the data packets based on the time that the data packet will be transmitted from the PHY. The data packets from the transmit timestamp processing block 244 may be supplied, in some embodiments through an additional processing block, to a transmit processing block 246. The transmit processing block 246 processes the data packets for transmission in the communication network.

The transmit processing block 246 may introduce delays, including variable delays, to packet transmission. For example, a packet may incur a delay in the transmit processing block 112 that depends on the timing of the arrival of the packet relative to frame boundaries in the transmit processing block 246.

The receive path block 260 includes a receive processing block 262 that receives an input signal from a communication link in the communication network. The receive processing block 262 processes the input signal to recover data from the input signal and produce data packets. The data packets are supplied to a receive timestamp processing block 264. Some of the data packets include timing-related messages that are modified by the receive timestamp processing block 264. The data packets from the receive timestamp processing block 168 may be supplied to a buffer and rate adapter block 262 which may adjust the rate or timing of transmission of the data packets to the higher level components via the interface block 224. The receive timestamp processing block 264 modifies the contents of the data packets that include timing-related messages based on the time that the data packet is received by the PHY.

The line card 205 further includes a local time counter (LTC) 220, which as illustrated receives a 1588 local clock signal 241 and distributes the local clock signal to various components for time stamp related purposes. The local clock may be locked to a master clock for synchronization purposes. In some embodiments, the local clock may be locked to an IEEE 1588 clock signal.

The LTC includes an N-bit counter which receives the timing signal from the central module. In turn, the N-bit counter may initiate a count of the cycles of the clock signal provided by the local clock at the rising edge of the input clock signal. In some embodiments, the N-bit counter may be reset when the clock signal is received. When the LTC reaches a predefined number (N) of clock cycles, a return clock signal may be generated and sent to central module. In some embodiments, the predefined number (N) of clock cycles is set according to a slot time for transmission of the packets in the buffer and rate adapter.

In operation, the central module distributes a timing signal to a line card. In some embodiments, the system may determine the transmission time of the timing signal (t1) and store the transmission time in memory. In some embodiments, the central module may include a transmission time in the packets distributed to the line cards. In some embodiments, the timing signal may include a delay measurement, which may be used, for example, to update a packet timestamp.

The line card receives the timing signal which is then provided to the LTC. In some embodiments the timing signal may also be provided to the local clock.

Upon receiving the timing signal the N-bit counter of the LTC is reset and a count sequence may be initiated on the rising edge of the input timing signal. In some embodiments, the N-bit counter is configured to count a number (N) of cycles of the local clock. The number (N) may be set to correspond to a slot time for data transmission. Slot time may be time needed to transfer 512 bits or 64 bytes of data over a communication network. Accordingly, when the N-bit counter reaches a sufficient number of cycles of the local clock to reach the slot time, the line card will transmit a return timing signal to the central module. The timing signal may include a time at which the return signal is being sent, the count of the N-bit counter. In some embodiments, the timing signal may further include a period (T) for the local clock. In some embodiments, the return timing signal may be transmitted to the central module via the same trace by which input timing signal was received at the line card.

The central module receives the return signal from the line card. In some embodiments, the arrival time (t2) of the return signal may be determined and stored in the memory. The processor may be used to execute the program instructions of the delay measurement program stored in memory to determine the propagation delay between the central module and the line card. In some embodiments, the propagation delay may be determined according to the following equation:

$$D = (t2 - t1 - N*T)/2,$$

where D is the delay; t2 is the arrival time of the return signal at the central module; t1 is the transmission time of the timing signal from the central module to the line card; N is the number of cycles counted by the N-bit counter of the LTC; and T is the period of the local clock for the line card.

Figure 3A:
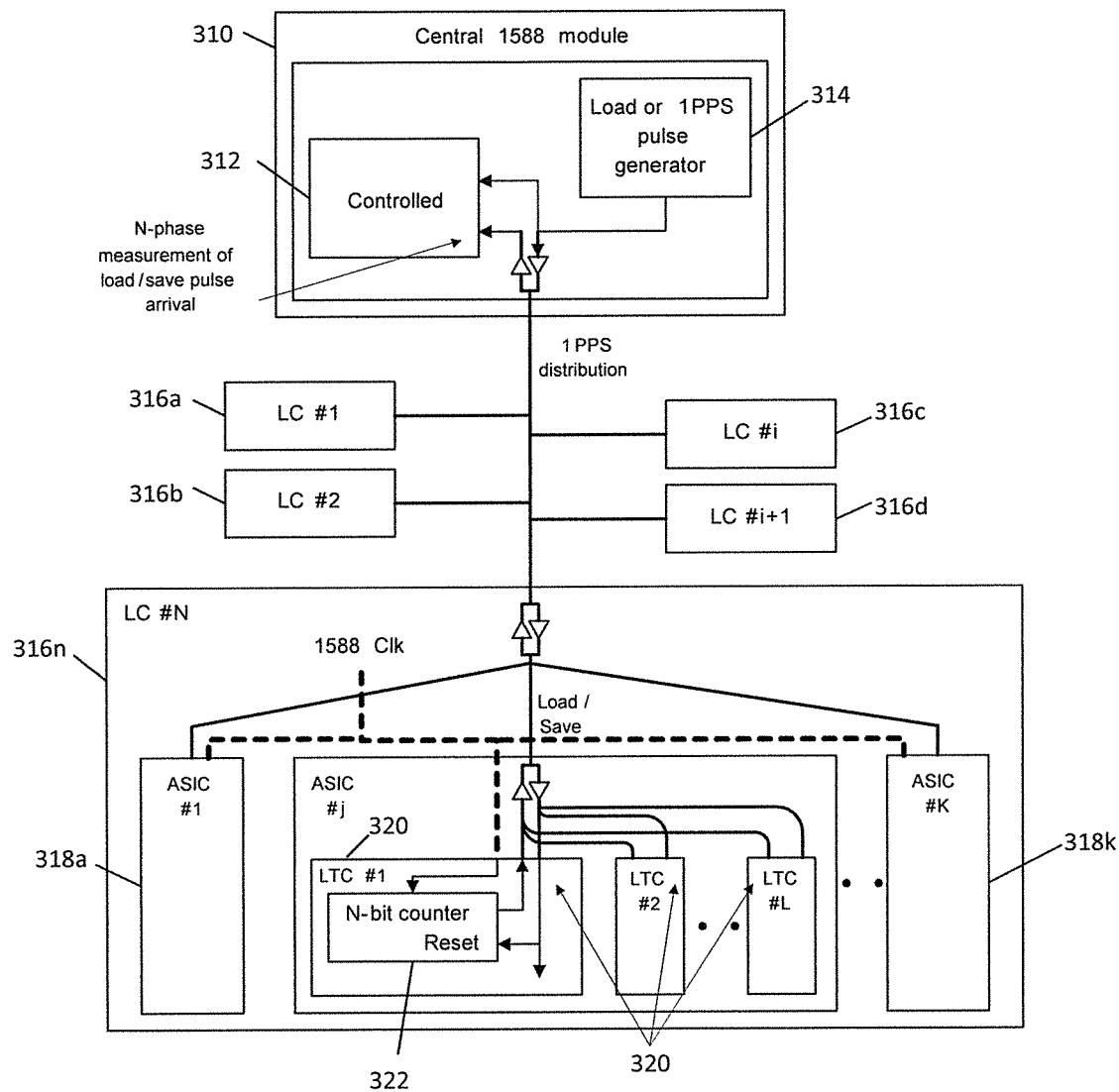
FIG. 3A is an expanded block diagram of a system in accordance with aspects of the invention.

FIG. 3A is a block diagram of a communication system for distributing timing information in accordance with aspects of the invention. As shown in FIG. 3A, the system includes a central timing module 310, and a plurality of line cards 316. Line card N, is shown in expanded form. The central timing module 310 includes a pulse generator 314 and a controller 312. The controller may include a processor and a storage device (not shown). The pulse generator generates a timing signal which may be distributed to each of the line cards. In some embodiments, the timing signal may be a 1 PPS signal.

As shown in line card N, each line card may include a plurality (K) of ASICs 318. Each ASIC may further include a plurality (L) of LTCs 320, each of which includes an N-bit counter 322. The local clock is locked to a 1588 clock signal and distributed to the N-bit counter for each of the LTCs. In some embodiments, the N-bit counter is set such that a round robin measurement occurs in each 1 second period. In some embodiments, for larger systems, the N-bit counters may be set to accommodate four measurements per 1 second period. For example, N=16 supports four measurements periods of 64 μsec each, using a 250 MHz 1588 clock. For example where there are four LTCs, each may have an N-bit counter set to generate a pulse at time=32 μs, 96 μs, 160 μs, and 224 μs respectively.

Figure 3B:
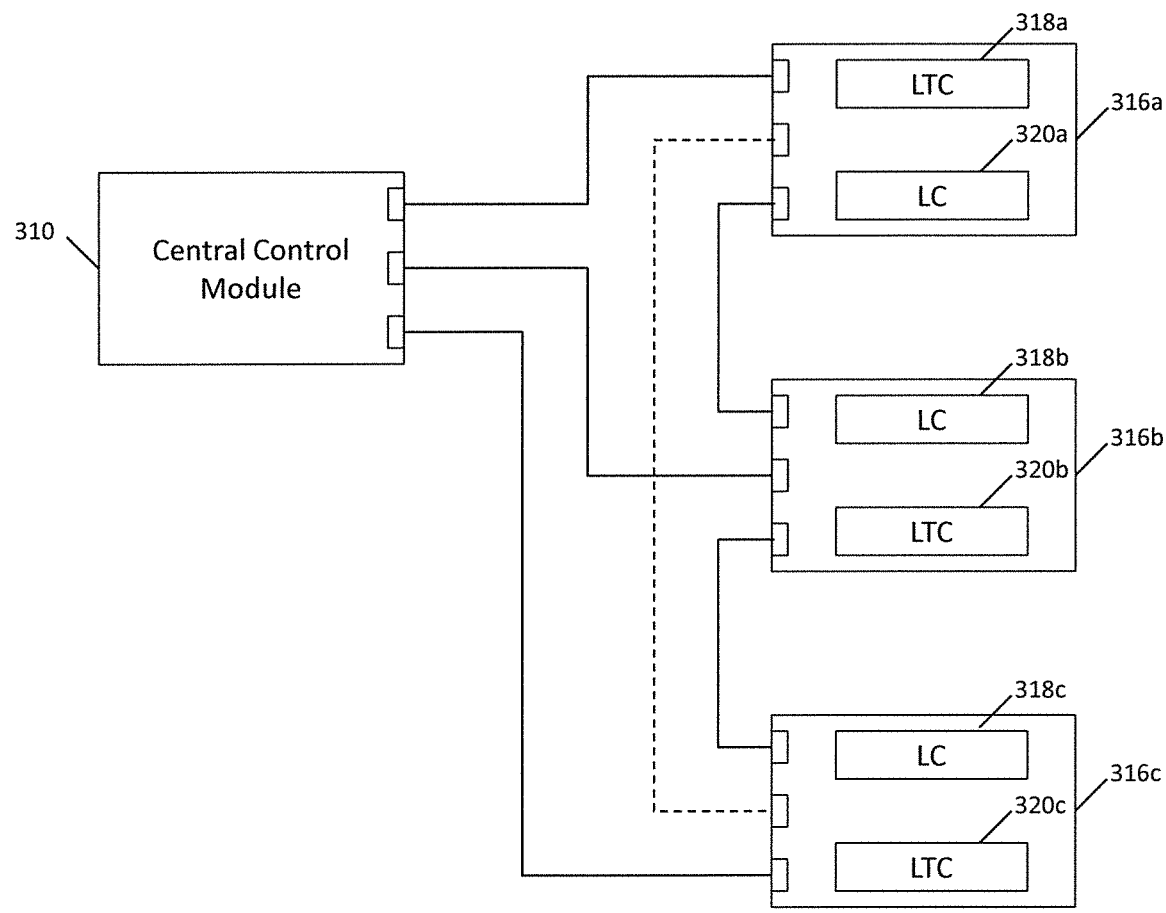
FIG. 3B is a block diagram illustrating a system for line card synchronization in accordance with aspects of the present invention.

The storage device of controller 312 may store therein program code which when executed may be used to measure a propagation delay between the central module and each line card. In some embodiments, the program code is further configured such that when executed via a processor may be used to measure a propagation delay between the central module and an ASIC of the line card FIG. 3B is a block diagram illustrating a system for line card synchronization in accordance with aspects of the present invention. As shown in FIG. 3B, central controller module 310 is coupled to a plurality of line cards 316a, 316b and 316c via links 312a, 312b, and 312c (that may be collectively referred to as link 312). Although, three line cards are shown, this is exemplary only and not limiting. In addition, each of the line cards may also be coupled to each other to enable efficient processing of network traffic, for example.

Each of the line cards may include one or more ASICs, for example as is discussed above with respect to FIG. 2, the line cards may also be configured synchronization circuitry to provide timestamp processing. The line cards and/or each ASIC thereon may further be configured with a LTC. The LTC includes an N-bit counter which is provided to count a number of cycles of a LC provided to each ASIC.

The central controller module distributes a clock signal to line cards 316a, 316b, and 316c. The clock signal received by the line cards is further distributed to ASICS included in the line cards. The clock signal is received in the LTC which initializes the N-bit counter which begins to count of cycles of the local clock signal. In some embodiments, the LC of line cards may be locked to a IEEE 1588 compliant clock signal.

The line cards each may generate a return signal which is sent to the central controller module to determine a timing delay relative to each line card. In some embodiments, the return signal may be generated after a predetermined number of clock cycles. In some embodiments, the return signal may be generated by each of the line cards on a time slotted basis.

In some embodiments, the line cards may be configured to provide a timing signal to other line cards which may be used to determine a propagation delay between modules and thereby enable synchronization of line cards with each other.

Figure 4:
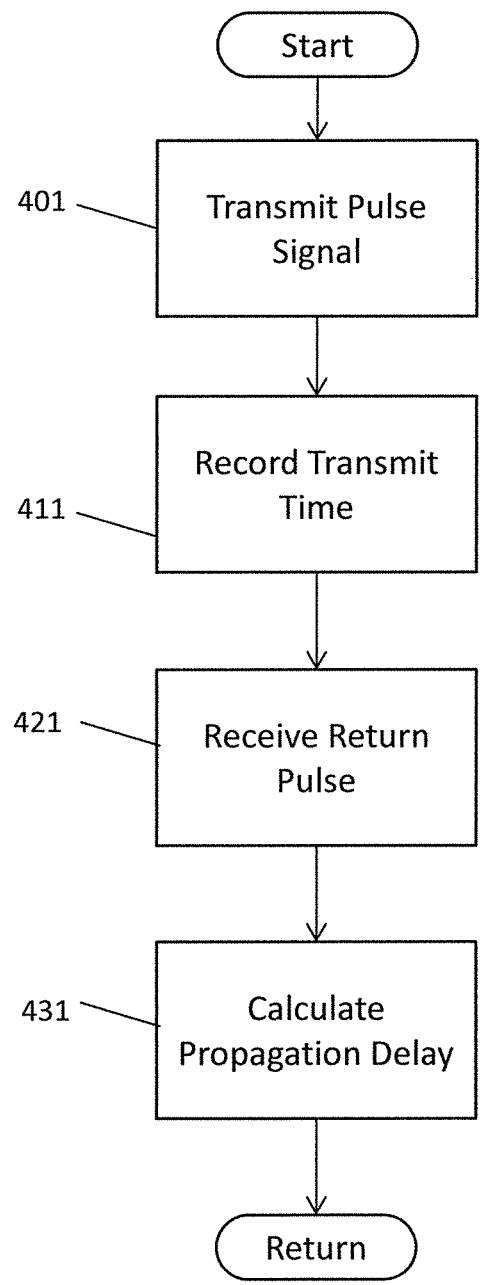
FIG. 4 is a flow diagram illustrating a process for handling timing information in accordance with aspects of the invention.

FIG. 4 is a flow diagram illustrating a process for measuring propagation delay in a communication network in accordance with aspects of the present invention. Referring to FIG. 4, at block 405, the process transmits a pulse from a central point to a plurality of line cards (LC). In some embodiments, the pulse may comprise a 1 Pulse Per Second (1 PPS) signal. At block 410, the process records the transmit time departure time (t1) of the 1 PPS signal.

Each of the line cards may include one or more ASICs. The ASIC may include a local clock which is frequency locked to an IEEE 1588 supported clock source. Each ASIC may also be configured with a local time counter (LTC). The LTC may be configured with an N-bit counter which maintains a count of local time clock cycles for each ASIC of the line card. In some embodiments, the LTC may be reset upon the arrival of the 1 PPS signal. Thereafter, the LTC may be incremented on the rising edge of the time tick of the local clock.

Each of the ASICs of each line card may further be configured to execute program instructions to send a return pulse to the central point via the same trace from which the 1 PPS signal was received at a timing which the LTC has reached a count of N (i.e., N×1588 CLK cycles).

At block 415, the process receives the return signal including the LTC count at the central point. The process records the arrival time (t2) and the LTC count in a memory location.

At block 420, the process calculates a propagation delay for the pulse signal. In some embodiments, the propagation delay may be calculated according to the following equation:

$$\text{Propagation delay} = (t2 - t1 - N \times 1588\_CLK\_period)/2$$

In some embodiments, the calculated propagation delay relative to each line card may be sent to the corresponding line card to enable synchronization of the line cards with the central controller module.

Thereafter, the process returns.

Figure 5:
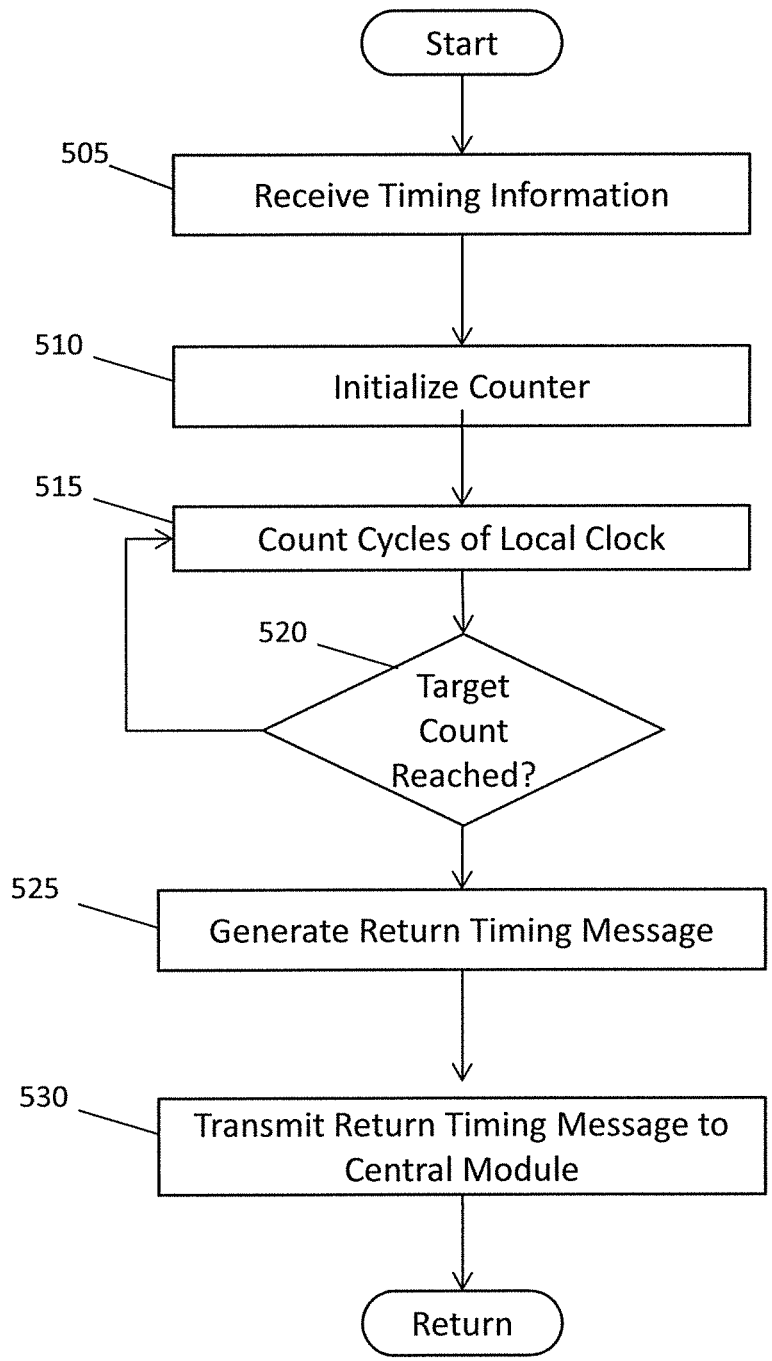
FIG. 5 is a flow diagram illustrating a process for handling timing information in accordance with aspects of the invention.

FIG. 5 is a flow diagram illustrating a process for handling timing information in accordance with aspects of the invention. The process may be performed by a module on a line card or a chip, and the module may be on LTC. At block 505, the process receives timing information from a central module. The timing information may include a timing signal such as a load signal, a save signal, a 1 PPS signal or the like. In some embodiments, the timing signal may further include a generation time or transmission time for the timing information. In some embodiments, the timing information may include a propagation delay measurement for calculating and/or updating a packet timestamp. The timing information may be received via a receive device of a line card, for example a receive path of a PHY. In some embodiments, the timing information may be distributed to ASICs of the line card. Each of the ASICs may be configured with an LTC.

At block 510, the process initializes the counter of the LTC. In some embodiments, the counter of the LTC may be initialized by resetting the counter upon receipt of the timing information. The counter may be configured to count a number of clock cycles of a local clock for the line card. In some embodiments, the local clock is an IEEE 1588 clock.

At block 515, the process counts cycles of the local clock. In some embodiments the count may begin on the rising edge of a clock cycle of the local clock following the reset of the counter.

At block 520, the process determines whether a target count has been reached. In some embodiments, the target count is a predefined cycle count set based on a slot time. If the count is less than the target cycle count, the process returns to block 515 and the cycle count continues. On the other hand, when the count equals the target cycle count, the process continues to block 525 at which the process generates a return timing message. In some embodiments the return timing message may include timing information such as the count of the counter, a period for the local clock. In some embodiments the timing information may provided to the timestamp processing block (shown in FIG. 2) to calculate an update of a packet timestamp.

At block 530, the process transmits the return timing message to the central module. The central module may utilize the return timing message to compute a propagation delay measurement.

In some embodiments, the propagation delay measurement may be used to synchronize each of the line cards with the central module.

Thereafter, the process returns.

Figure 6:
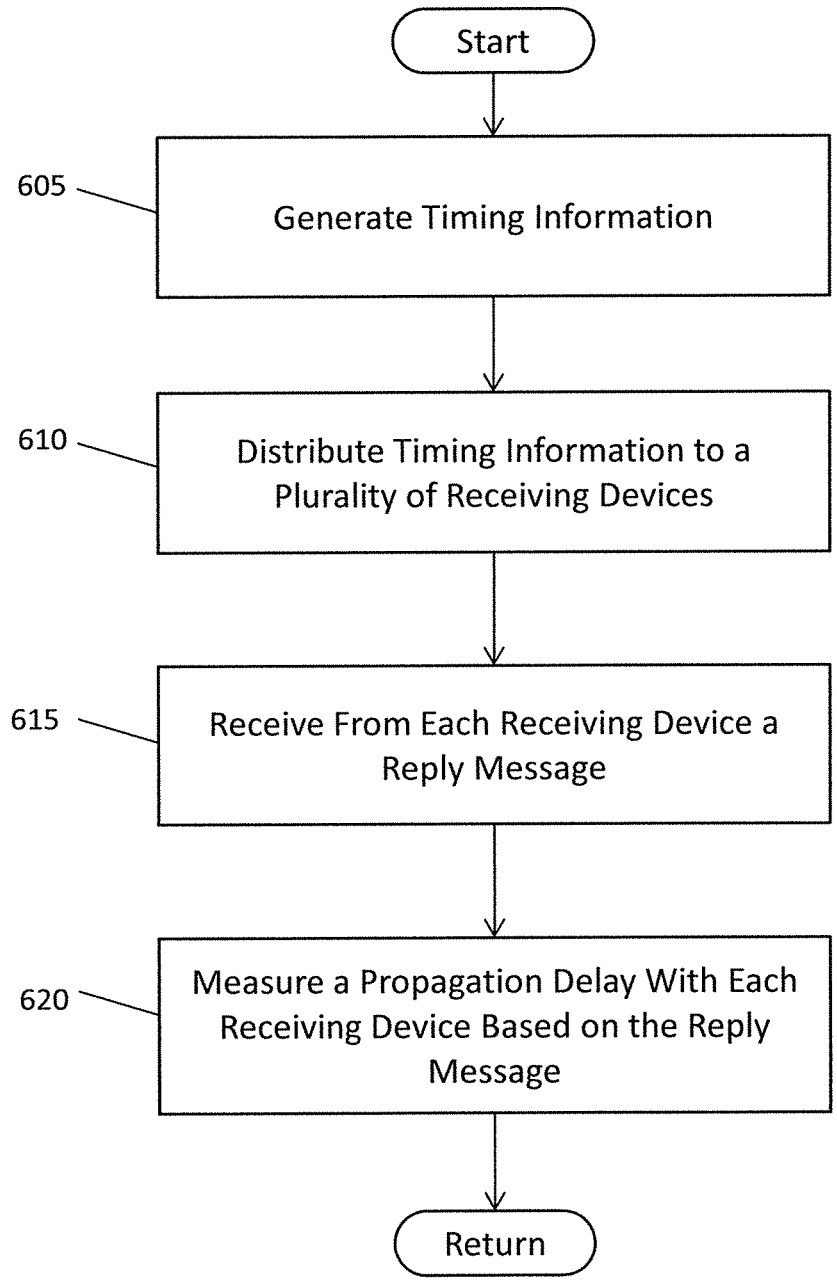
FIG. 6 is a flow diagram illustrating a process for handling timing information in accordance with aspects of the invention.

FIG. 6 is a flow diagram illustrating a process for handling timing information in accordance with aspects of the invention. The process may be performed, in various embodiments by a module on a chip or line card, by a programmed processor, or by a central 1588 module, for example. At block 605, the process generates timing information. In some embodiments, the timing information may include may include a timing signal such as a load signal, a save signal, a 1 PPS signal or the like.

At block 610, the process distributes the timing information to a plurality of receiving devices. The receiving devices may include a line card, an ASIC, a transceiver, other receiving devices and/or a combination thereof.

At block 615, the process, receives from each of the receiving devices, a Reply including timing information. In some embodiments, the reply may include a transmission time for the reply and a count of the number of clock cycles of a local clock prior to transmission of the reply. In some embodiments, the local clock may be locked to a IEEE 1588 clock.

At block 620, the process measures a propagation delay between a central source and each of the receiving devices. In some embodiments, the propagation delay (D) may be measured according to the following equation:

$$D = (t2 - t1 + ds + dm - N*T)/2, \text{ where}$$

T1 is the time for generating the timing information; t2 is the arrival time for the reply; ds is the sub-clock cycle delay measured by the N-bit counter; dm is the sub-clock cycle value; N is the count of the N-bit counter; T is the period of the local clock.

Thereafter, the process returns.

Although the invention has been discussed with respect to various embodiments, it should be recognized that the invention comprises the novel and non-obvious claims supported by this disclosure.

What is claimed is:

1. A method for measuring a propagation delay in a multi-point communication system, comprising:
   generating a timing signal from a central timing module;
   transmitting the timing signal to at least one line card, each of the at least one line card including a local time counter (LTC), the LTC configured to be responsive to a local clock of the respective line card;
   responsive to the received transmitted timing signal, the LTC of the respective line card initiating a count of a respective predetermined number of clock cycles of the respective local clock, and upon reaching the respective predetermined number of clock cycles of the respective local clock, the respective line card transmitting a timing response to the central timing module, the timing response including timing delay information for the respective line card; and
   measuring the propagation delay at the central timing module for the respective line card responsive to the transmitted timing response of the respective line card.

2. The method of claim 1, wherein the timing signal is a pulse signal transmitted at a rate of 1 pulse per second (1 PPS).

3. The method of claim 1, wherein the at least one line card includes at least one application specific integrated circuit (ASIC).

4. The method of claim 1, wherein the local clock of each line card is operated at a frequency which is locked to an IEEE 1588 compliant clock source.

5. The method of claim 1, wherein the timing delay information for the respective line card includes the respective predetermined number of clock cycles and a period of the respective local clock.

6. The method of claim 1, wherein the propagation delay for the respective line card is measured according to $(t2-t1-N*T)/2$, where t2 is an arrival time of the timing response from the respective line card, t1 is the time of transmitting the timing signal to the at least one line card, N is the respective predetermined number of clock cycles of the respective line card, and T is a period of the respective local clock.

7. A method for measuring a propagation delay in a multi-point communication system, comprising:
- generating a timing signal from a central timing module;
- distributing the timing signal to a plurality of receiving devices, each of the receiving devices being configured with a local time counter responsive to a local clock of the respective receiving device;
- responsive to the received timing signal, the local time counter of the respective receiving device initiating a count of a respective predetermined number of clock cycles of the respective local clock, and upon reaching the respective predetermined number of clock cycles of the respective local clock, the respective receiving device transmitting a reply message to the central timing module, the reply message including timing delay information for the respective receiving device, the reply messages being generated by each of the receiving devices according to a respective slot time for the respective receiving device, said respective slot time set responsive to the respective predetermined number of clock cycles;
- measuring the propagation delay between the central timing module and each of the respective receiving devices at the central timing module responsive to the received reply message from the respective receiving devices.

8. The method of claim 7, wherein the timing signal is a 1 pulse per second signal.

9. The method of claim 7, wherein the timing delay information for the respective receiving device includes the respective predetermined number of clock cycles and a period of the respective local clock.

10. A system for measuring propagation delay in a communication network, the system comprising:
- a timing module configured to distribute a timing signal; and
- at least one line card in communication with said timing module and arranged to receive said distributed timing signal, each of the at least one line card including a local time counter (LTC), the LTC responsive to a local clock of the respective line card,
  - each said line card arranged, responsive to the received distributed timing signal to:
    - count a respective predetermined number of clock cycles of the respective local clock; and
    - upon reaching the respective predetermined number of clock cycles of the respective local clock, transmit a timing response to the timing module, the timing response including timing delay information for the respective line card,
  - the timing module arranged to calculate the propagation delay for each respective line card responsive to the timing response of the respective line card.

11. The system of claim 10, wherein the propagation delay for each respective line card is further determined based on a transmission time of the distributed timing signal and an arrival time of the respective timing response at the timing module.

12. The system of claim 10, wherein the local clock of each line card is operated at a frequency locked to an IEEE 1588 compliant clock.

13. The system of claim 10, wherein the respective predetermined number of clock cycles is set according to a predefined slot time.

14. The system of claim 10 wherein said at least one line card comprises a plurality of line cards, a first line card providing timing information to at least one other line card to enable synchronization between the first line card and the at least one other line card.

15. A method for conducting timing related processing in a multi-point communication system, comprising:
- generating a timing signal from a central timing module;
- transmitting the timing signal to at least one line card, each of the at least one line card including a local time counter (LTC) and a local clock, the LTC responsive to the local clock;
- responsive to the received transmitted timing signal, the LTC of the respective line card initiating a count of a respective predetermined number of clock cycles of the respective local clock, and upon reaching the respective predetermined number of clock cycles of the respective local clock, the respective line card transmitting a timing response to the central timing module, the timing response including timing delay information for the respective line card;
- determining the propagation delay at the central timing module for the respective line card responsive to the timing response of the respective line card; and
- providing the respective determined propagation delay to the respective line card for synchronization of the respective line card with the central timing module.

16. The method of claim 15, wherein the at least one line card includes at least one application specific integrated circuit (ASIC).

17. The method of claim 16, wherein the at least one ASIC is further synchronized with the central timing module.

18. The method of claim 15, wherein the local clock of each line card is operated at a frequency which is locked to an IEEE 1588 compliant clock source.

19. The method of claim 15, wherein the timing delay information for the respective line card includes the respective predetermined number of clock cycles and a period of the respective local clock.

20. The method of claim 15, wherein the propagation delay for the respective line card is measured according to (t2−t1−N*T)/2, where t2 is an arrival time of the timing response from the respective line card, t1 is the time of transmitting the timing signal to the at least one line card, N is the respective predetermined number of clock cycles of the respective line card, and T is a period of the respective local clock.

* * * * *